US012586938B2

(12) United States Patent
Liao et al.

(10) Patent No.: US 12,586,938 B2
(45) Date of Patent: Mar. 24, 2026

(54) CONNECTOR ASSEMBLY AND CONNECTOR

(71) Applicant: Bellwether Electronic Corp., Taoyuan City (TW)

(72) Inventors: Yen-Jang Liao, Taoyuan City (TW); Fan-Hsuan Liu, Taoyuan City (TW); Po-Kuei Su, Taoyuan City (TW)

(73) Assignee: Bellwether Electronic Corp., Taoyuan City (TW)

( * ) Notice: Subject to any disclaimer, the term of this patent is extended or adjusted under 35 U.S.C. 154(b) by 0 days.

(21) Appl. No.: 19/007,321

(22) Filed: Dec. 31, 2024

(65) Prior Publication Data

US 2025/0239792 A1 Jul. 24, 2025

Related U.S. Application Data

(60) Provisional application No. 63/622,547, filed on Jan. 19, 2024.

(30) Foreign Application Priority Data

Oct. 22, 2024 (TW) ................................ 113140147

(51) Int. Cl.
*H01R 12/71* (2011.01)
*H01R 12/73* (2011.01)

(52) U.S. Cl.
CPC ........... *H01R 12/716* (2013.01); *H01R 12/73* (2013.01)

(58) Field of Classification Search
None
See application file for complete search history.

(56) References Cited

U.S. PATENT DOCUMENTS 8,961,201 B2 * 2/2015 Griese .................. H01R 9/2675 439/121
11,404,806 B2 * 8/2022 Chen .................. H01R 12/7088
11,539,154 B2 * 12/2022 Horning ............. H01R 12/7088
11,581,672 B2 * 2/2023 Chen .................. H01R 12/7088
11,811,159 B2 * 11/2023 Chen .................... H01R 12/721
11,817,646 B2 * 11/2023 Chen .................. H01R 13/2457
(Continued)

FOREIGN PATENT DOCUMENTS

TW 202143561 A 11/2021
TW M631260 U 8/2022
(Continued)

*Primary Examiner* — Ross N Gushi
(74) *Attorney, Agent, or Firm* — CKC & Partners Co., LLC

(57) ABSTRACT

A connector assembly includes a first circuit board, a first connector, a second circuit board, a second connector, a plug, and a blocking portion. The first connector is disposed on the first circuit board. The first connector includes a first conductive terminal, a first busbar, and a first sleeve. The first busbar is connected to the first conductive terminal. The second connector is disposed on the second circuit board. The second connector includes a second conductive terminal, a second busbar, and a second sleeve. The second busbar is connected to the second conductive terminal. The second sleeve is connected to the second busbar. The plug passes through the first sleeve of the first connector and the second sleeve of the second connector. The blocking portion is disposed on the plug. A diameter of the blocking portion is greater than a diameter of the plug.

20 Claims, 12 Drawing Sheets

(56) References Cited

U.S. PATENT DOCUMENTS

| | | | | |
|---|---|---|---|---|
| 11,909,136 B2 * | 2/2024 | Chen | H01R 11/09 |
| 12,142,862 B2 * | 11/2024 | Chen | H01R 12/58 |
| 12,176,637 B2 * | 12/2024 | Gieski | H01R 12/7064 |
| 12,401,146 B2 * | 8/2025 | Gieski | H01R 12/732 |
| 2023/0006379 A1 * | 1/2023 | Gieski | H01R 12/716 |
| 2023/0163528 A1 * | 5/2023 | Gieski | H01R 12/7082<br>439/59 |

FOREIGN PATENT DOCUMENTS

| | | | |
|---|---|---|---|
| TW | 202236746 | A | 9/2022 |
| WO | 2022173732 | A1 | 8/2022 |

* cited by examiner

CONNECTOR ASSEMBLY AND CONNECTOR

CROSS-REFERENCE TO RELATED APPLICATION

This application claims priority to U.S. Provisional Application Ser. No. 63/622,547 filed Jan. 19, 2024, and Taiwan Application Serial Number 113140147, filed Oct. 22, 2024, the disclosures of which are incorporated herein by reference in their entireties.

BACKGROUND

Field of Invention

The present invention relates to a connector assembly and a connector.

Description of Related Art

Generally speaking, a connector (e.g., a card-edge connector) for connecting with an expansion card is fixed on a circuit board (e.g., a motherboard). Therefore, when the user inserts the expansion card into the socket on the connector, the circuit board can build a connection of electrical signals (including receive/transmit current) with the expansion card.

As the demand for transmitting large currents and the demand for connecting with multiple expansion cards at the same time increases, it is necessary to provide a hardware framework that can: accommodate multiple connectors simultaneously; ensure that the structure between multiple connectors is stable; and can simultaneously connect with different expansion cards. However, existing products fail to provide a connector assembly that satisfies users.

Therefore, how to propose a connector assembly and a connector that can solve the aforementioned problems is one of the problems that the industry is currently eager to invest in research and development resources to solve.

SUMMARY

In view of this, one purpose of the present disclosure is to provide a connector assembly and a connector that can solve the aforementioned problems.

In order to achieve the above objective, in accordance with an embodiment of the present disclosure, a connector assembly includes a first circuit board, a first connector, a second circuit board, a second connector, a plug, and a blocking portion. The first connector is disposed on the first circuit board. The first connector includes a first conductive terminal, a first busbar, and a first sleeve. The first busbar is connected to the first conductive terminal. The first sleeve is connected to the first busbar. The second circuit board is separated from the first circuit board. The second connector is disposed on the second circuit board. The second connector includes a second conductive terminal, a second busbar, a second sleeve. The second busbar is connected to the second conductive terminal. The second sleeve is connected to the second busbar. The plug passes through the first sleeve of the first connector and the second sleeve of the second connector. The blocking portion is disposed on the plug. The blocking portion abuts against or is fixed to the first connector.

In one or more embodiments of the present disclosure, the blocking portion abuts against a top portion of the first sleeve.

In one or more embodiments of the present disclosure, the first connector further includes a first housing wrapping the first conductive terminal and a first cover body wrapping the first busbar. The first housing includes a first barb. The first cover body includes a first hook. The first housing and the first cover body are respectively engaged with each other by the first barb and the first hook.

In one or more embodiments of the present disclosure, the first housing further has a first socket and a second socket separated from the first socket. The first conductive terminal includes a first end portion corresponding to the first socket and a second end portion corresponding to the second socket.

In one or more embodiments of the present disclosure, the second end portion of the first conductive terminal clamps the first busbar.

In one or more embodiments of the present disclosure, the first cover body further includes a first cover main body, a first top plate, and a first partitioning portion. The first top plate covers the first cover main body. The first partitioning portion is disposed between the first cover main body and the first top plate. The first partitioning portion, the first cover main body, and the first top plate jointly define two accommodating cavities of the first cover body.

In one or more embodiments of the present disclosure, the first sleeve is located in one of the two accommodating cavities and runs through the first cover main body and the first top plate.

In one or more embodiments of the present disclosure, the first busbar includes the first busbar includes one or more first vertical extending portions, one or more first bending portions, and a first horizontal extending portion. One or more first vertical extending portions contact the first conductive terminal. One or more first bending portions are connected to the one or more first vertical extending portions. The first horizontal extending portion is connected to the one or more first bending portions.

In one or more embodiments of the present disclosure, the connector assembly further includes a crown spring. The first sleeve has a hollowed through hole. The crown spring surrounds an inner surface of the hollowed through hole. The crown spring clamps the plug.

In one or more embodiments of the present disclosure, the first sleeve includes a sleeve main body, a cap portion, and an interfering portion. The sleeve main body is connected to the first busbar. The cap portion is located on a top portion of the sleeve main body and bears against a surface of the first busbar. A diameter of the cap portion is greater than a diameter of the sleeve main body. The interfering portion is disposed on the sleeve main body. The interfering portion is engaged with the first busbar.

In one or more embodiments of the present disclosure, a width of the blocking portion is greater than a width of the plug.

In one or more embodiments of the present disclosure, the first conductive terminal includes a plurality of one of the following or a combination of the following that are fixed to each other: a fixed conductive terminal including a first end portion, a second end portion, a fixed portion, and a welding pin; and a floating conductive terminal including a first end portion, a second end portion, and a fixed portion.

In one or more embodiments of the present disclosure, the first end portion, the second end portion, the fixed portion, and the welding pin of the fixed conductive terminal are coplanar.

In order to achieve the above objective, in accordance with an embodiment of the present disclosure, a connector includes a first housing, a plurality of first conductive terminals, a first busbar, and a first sleeve. The first housing has a first socket and a second socket separated from the first socket. The first socket is configured to allow an expansion card to insert. Each of the first conductive terminals includes a first end portion corresponding to the first socket and a second end portion corresponding to the second socket. The first busbar with one end located in the second socket is connected to the second end portion. The first sleeve is connected to the other end of the first busbar and has a groove or a through hole that are hollowed.

In one or more embodiments of the present disclosure, the connector further includes a crown spring surrounding an inner surface of the groove or the through hole.

In one or more embodiments of the present disclosure, the first busbar includes one or more first vertical extending portions, one or more first bending portions, and a first horizontal extending portion. The one or more first vertical extending portions contact the second end portion. The one or more first bending portions are connected to the one or more first vertical extending portions. The first horizontal extending portion is connected to the one or more first bending portions.

In one or more embodiments of the present disclosure, each of the first conductive terminals includes a plurality of one of the following or a combination of the following that are fixed to each other: a fixed conductive terminal including a first end portion, a second end portion, a fixed portion, and a welding pin; and a floating conductive terminal including a first end portion, a second end portion, and a fixed portion.

In one or more embodiments of the present disclosure, the first end portion, the second end portion, the fixed portion, and the welding pin of the fixed conductive terminal are coplanar.

In one or more embodiments of the present disclosure, connector further includes a cover body. The cover body includes two accommodating cavities. The two accommodating cavities are separated by a partitioning portion. The first busbar is accommodated in one of the two accommodating cavities.

In one or more embodiments of the present disclosure, each of the two accommodating cavities has an opening for heat dissipation.

In summary, in the connector assembly and connector of the present disclosure, since the first cover body and the first housing are engaged with each other by the first hook and the first barb respectively, the connection structure among the first conductive terminal, the first busbar, and the first sleeve can be stable, thereby ensuring the stability of the overall structure of the first connector. In the connector assembly and connector of the present disclosure, since the second cover body and the second housing are also engaged with each other by the second hook and the second barb respectively, the connection structure among the second conductive terminal, the second busbar, and the second sleeve can be stable, thereby ensuring the stability of the overall structure of the second connector. In the connector assembly and connector of the present disclosure, since the plug passes through the first sleeve of the first connector and the second sleeve of the second connector at the same time, the electrical signals of the expansion card read by the second circuit board can be transmitted to the first circuit board by the plug, thereby achieving connection of electrical signals from different expansion cards with different connectors. In the connector assembly and connector of the present disclosure, since the blocking portion is disposed in the middle section of the plug, and the diameter of the blocking portion is greater than the diameter of the plug, the second connector is separated from the first connector by a distance, thereby achieving the structural ability of the first connector and the second connector in the connector assembly. In the connector assembly and connector of the present disclosure, since the inner surface of the first sleeve and the inner surface of the second sleeve are surrounded by the crown spring, the crown spring can not only increase the contact area between the plug and the first sleeve and between the plug and the second sleeve to meet the demand for transmitting large currents, the crown spring also provides a positive force between the plug and the first sleeve and between the plug and the second sleeve to achieve auxiliary fixation between the second connector and the plug. Overall, the connector assembly of the present disclosure can not only connect electrical signals from a plurality of expansion cards on a plurality of connectors in series, but also achieve structural stability of the plurality of connectors in the overall connector assembly.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
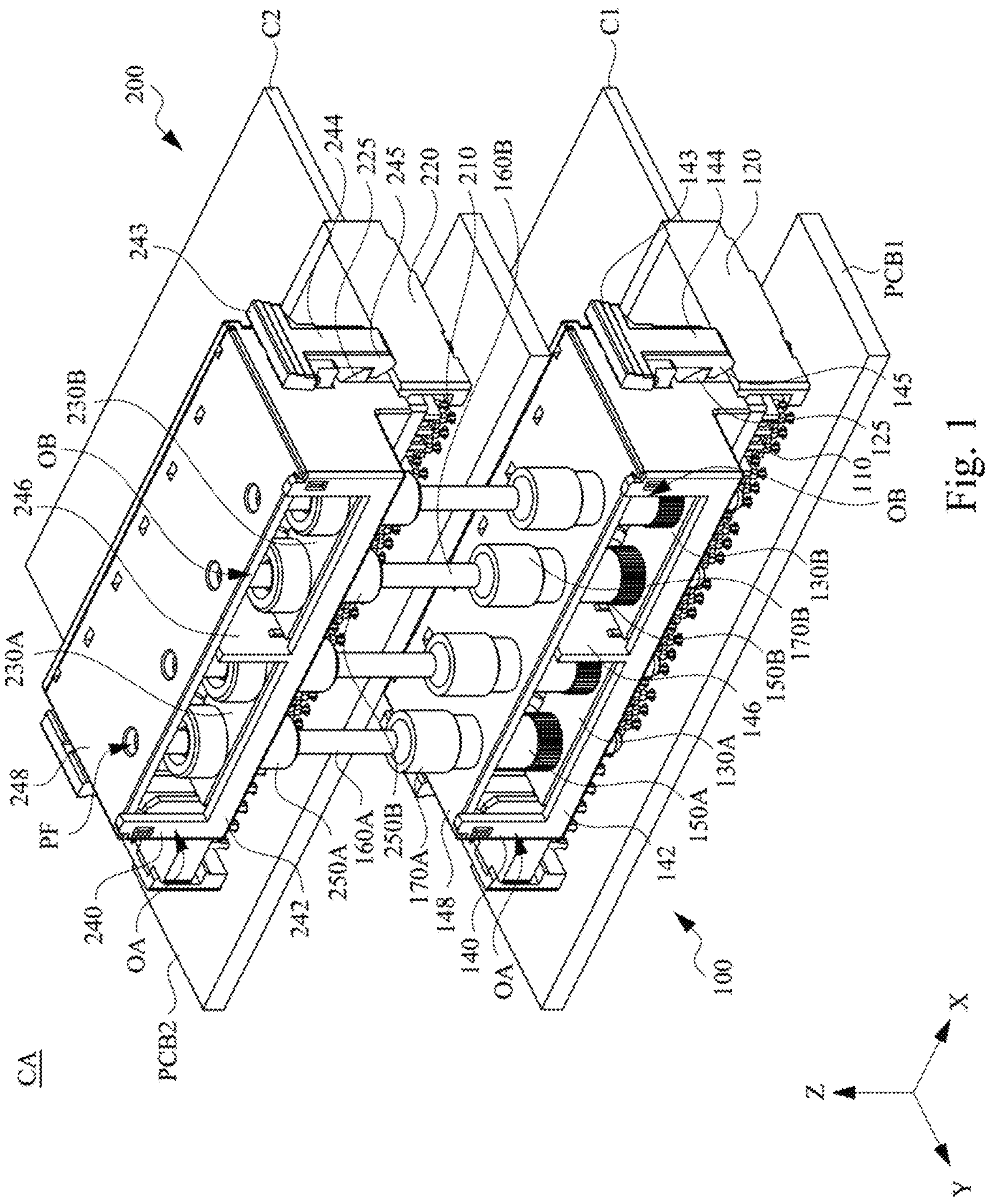
FIG. 1 is a perspective view of a connector assembly in accordance with an embodiment of the present disclosure.

Hereinafter, a plurality of embodiments of the present disclosure will be disclosed in diagrams. For the sake of clarity, many details in practice will be described in the following description. However, it should be understood that these details in practice should not limit present disclosure. In other words, in some embodiments of present disclosure, these details in practice are unnecessary. In addition, for simplicity of the drawings, some conventionally used structures and elements will be shown in a simple schematic manner in the drawings. The same reference numbers are used in the drawings and the description to refer to the same or like parts.

Hereinafter, the structure and function of each component included in a connector assembly CA of this embodiment and the connection relationship between the components will be described in detail.

Reference is made to FIG. 1. FIG. 1 is a perspective view of a connector assembly CA in accordance with an embodiment of the present disclosure. As shown in FIG. 1, in this embodiment, the connector assembly CA includes a circuit board PCB1, a connector 100, a circuit board PCB2, a connector 200, a plug 160A, a plug 160B, a blocking portion 170A, and a blocking portion 170B. The connector 100 is disposed on the circuit board PCB1. The connector 200 is disposed on the circuit board PCB2. The circuit board PCB1 and the circuit board PCB2 are independently separated from each other. In some embodiments, the circuit board PCB2 is located over the circuit board PCB1, and the circuit board PCB1 and the circuit board PCB2 are parallel to each other. The connector 100 is configured to allow an expansion card C1 to insert, and the connector 200 is configured to allow the expansion card C2 to insert. The plugs 160A and 160B may be cylinders and are electrically connected to the connector 100 and the connector 200. By the aforementioned structural configuration, when the expansion card C1 is inserted into the connector 100 and the expansion card C2 is inserted into the connector 200, the connector 200 can transmit the electrical signals of the expansion card C2 to the circuit board PCB2 and to the circuit board PCB1 by the plug 160A and the plug 160B. Accordingly, the connector assembly CA can transmit electrical signals of the expansion card C1 and the electrical signals of the expansion card C2 in parallel, and simultaneously obtain the electrical signals of the expansion card C1 and the electrical signals of the expansion card C2 to the circuit board PCB1.

Reference is made again to FIG. 1. As shown in FIG. 1, in this embodiment, the connector 100 includes a conductive terminal 110, a housing 120, a busbar 130A, a busbar 130B, a cover body 140, a sleeve 150A, and a sleeve 150B. The housing 120 wraps a plurality of conductive terminals 110. The housing 120 has at least one socket configured to allow the expansion card C1 to insert. The plurality of conductive terminals 110 are disposed on the circuit board PCB1, and a part of the plurality of conductive terminals 110 is located in the at least one socket for docking with the expansion card C1. The busbar 130A and the busbar 130B are connected to the plurality of conductive terminals 110. The cover body 140 wraps the busbar 130A and the busbar 130B. The sleeve 150A and the sleeve 150B are respectively connected to the busbar 130A and the busbar 130B and have grooves or through holes that are hollowed. As shown in FIG. 1, the housing 120 includes a barb 125. The cover body 140 includes a cover main body 142, a buckle structure, and a top plate 148. The buckle structure is configured to be buckled with the barb 125. The buckle structure includes a pressing portion 143, a connecting arm 144, and a hook 145. The pressing portion 143 is disposed on a side surface of the cover main body 142. The pressing portion 143 and the hook 145 are located at both ends of the connecting arm 144. In other words, the connecting arm 144 is connected between the hook 145 and the pressing portion 143. The pressing portion 143 and the hook 145 seesaw relative to the cover main body 142. The top plate 148 covers the cover main body 142. The cover body 140 may also include a partitioning portion 146 disposed between the cover main body 142 and the top plate 148 configured to electrically isolate the busbar 130A and the busbar 130B. The partitioning portion 146, the cover main body 142, and the top plate 148 jointly define two accommodating cavities configured to respectively accommodate the busbar 130A and the busbar 130B. The accommodating cavities respectively form an opening OA and an opening OB on the cover body 140. In detail, the partitioning portion 146 divides a space formed by the cover main body 142 and the top plate 148 into the two accommodating cavities that have the opening OA and the opening OB respectively for heat dissipation. As shown in FIG. 1, the housing 120 and the cover body 140 are engaged with each other by the barb 125 and the hook 145, respectively. The sleeve 150A and the sleeve 150B are respectively located in the two accommodating cavities of the cover body 140. The sleeve 150A and the sleeve 50B run through the cover main body 142 and the top plate 148.

Reference is made again to FIG. 1. As shown in FIG. 1, in this embodiment, the connector 200 includes a conductive terminal 210, a housing 220, a busbar 230A, a busbar 230B, a cover body 240, a sleeve 250A, and a sleeve 250B. The housing 220 wraps a plurality of conductive terminals 210. The housing 220 has at least one socket configured to allow the expansion card C2 to insert. The plurality of conductive terminals 210 are disposed on the circuit board PCB2, and a part of the plurality of conductive terminals 210 is located in the at least one socket for docking with the expansion card C2. The busbar 230A and the busbar 230B are connected to the plurality of conductive terminals 210. The cover body 240 wraps the busbar 230A and the busbar 230B. The sleeve 250A and the sleeve 250B are respectively connected to the busbar 230A and the busbar 230B. As shown in FIG. 1, the housing 220 includes a barb 225. The cover body 240 includes a cover main body 242, a buckle structure, and a top plate 248. The buckle structure is configured to be buckled with the barb 225. The buckle structure includes a pressing portion 243, a connecting arm 244 and a hook 245. The pressing portion 243 is disposed on a side surface of the cover main body 242. The pressing portion 243 and the hook 245 are located at both ends of the connecting arm 244. In other words, the connecting arm 244 is connected between the hook 245 and the pressing portion 243. The pressing portion 243 and the hook 245 seesaw relative to the cover main body 242. The top plate 248 covers the cover main body 242. The cover body 240 may also include a partitioning portion 246 disposed between the cover main body 242 and the top plate 248 to electrically isolate the busbar 230A and the busbar 230B. The partitioning portion 246, the cover main body 242, and the top plate 248 jointly define two accommodating cavities to respectively accommodate the busbar 230A and the busbar 230B. The accommodating cavities respectively form an opening OA and an opening OB on the cover body 240. In detail, the partitioning portion 246 divides a space formed by the cover main body 242 and the top plate 248 into the two accommodating cavities that have the opening OA and the opening OB respectively for heat dissipation. As shown in FIG. 1, the housing 220 and the cover body 240 are engaged with each other by the barb 225 and the hook 245, respectively. The sleeve 250A and the sleeve 250B are respectively located in the two accommodating cavities of the cover body 240. The sleeve 250A and the sleeve 250B run through the cover main body 242. As shown in FIG. 1, the top plate 248 of the cover body 240 has a plurality of perforations PF for the plug 160A and the plug 160B to pass through.

Reference is made again to FIG. 1. As shown in FIG. 1, in this embodiment, the plug 160A passes through the sleeve 150A of the connector 100 and the sleeve 250A of the connector 200. The plug 160B passes through the sleeve 150B of the connector 100 and the sleeve 250B of the connector 200. Please also refer to FIG. 3. The blocking portion 170A is disposed on the plug 160A. The blocking portion 170B is disposed on the plug 160B. The blocking portion 170A may be integrally formed with the plug 160A. The blocking portion 170B may be integrally formed with the plug 160B. In detail, the blocking portion 170A and the blocking portion 170B are respectively located at a middle section of the plug 160A and a middle section of the plug 160B. In some embodiments, a distance between the blocking portion 170A and an end of the plug 160A may be shorter than a distance between the blocking portion 170A and the other end of the plug 160A, and a distance between the blocking portion 170B and an end of the plug 160B may be shorter than a distance between the blocking portion 170B and the other end of the plug 160B. In some embodiments, a diameter of the blocking portion 170A is greater than a diameter of the plug 160A and a diameter of the hollowed grooves or through holes of the sleeve 150A, and a diameter of the blocking portion 170B is greater than a diameter of the plug 160B and a diameter of the hollowed grooves or through holes of the sleeve 150B. In some other embodiments, the blocking portion 170A and the blocking portion 170B are structures protruding from outer surfaces of the plug 160A and the plug 160B respectively, so that a width of the blocking portion 170A and a width of the blocking portion 170B are respectively greater than a width of the plug 160A and a width of the plug 160B, and the width of the blocking portion 170A and the width of the blocking portion 170B are also greater than a width of the hollowed grooves or hollowed through holes of the sleeve 150A and the sleeve 150B. This ensures that the blocking portion 170A abuts against a top portion of the sleeve 150A when the plug 160A passes through the sleeve 150A from top to bottom and the blocking portion 170B abuts against a top portion of the sleeve 150B when the plug 160B passes through the sleeve 150B from top to bottom, so that the plug 160A and the plug 160B are stationary relative to the connector 100.

In some embodiments, the connector 100 and the connector 200 may be, for example, a card-edge connector or other similar connector.

In some embodiments, the circuit board PCB1 is configured as a mother board in the connector assembly CA, and the circuit board PCB2 is configured as a secondary board in the connector assembly CA. In this case, the connector assembly CA can receive the electrical signals of the expansion card C2 to the circuit board PCB1 serving as the mother board by the plug 160A and the plug 160B, so as to simultaneously process (receive) the electrical signals of the expansion card C1 and the electrical signals of the expansion card C2.

In some other embodiments, both the circuit board PCB1 and the circuit board PCB2 can be configured as secondary boards in the connector assembly CA. In this case, the connector assembly CA can simultaneously receive the electrical signals of the expansion card C2 and the electrical signals of the expansion card C1 by the plug 160A and the plug 160B, and then connect the electrical signals to the mother board, so as to simultaneously process the electrical signals of the expansion card C1 and the electrical signals of the expansion card C2.

In some embodiments, the busbar 130A and the busbar 230A are configured as positive busbars, and the busbar 130B and the busbar 230B are configured as negative busbars. Therefore, the sleeve 150A, the plug 160A, and the sleeve 250A are configured to output a current to the circuit board PCB1 and the circuit board PCB2, whereas the sleeve 150B, the plug 160B, and the sleeve 250B are configured to receive a current from the circuit board PCB1 and the circuit board PCB2.

In some embodiments, as shown in FIG. 1, two sleeves 150A and two sleeves 150B are arranged along a direction (e.g., x-direction). The two sleeves 250A and the two sleeves 250B are arranged along a direction (e.g., x-direction). Two plugs 160A and two plugs 160B are also arranged along a direction (e.g., x-direction).

In some embodiments, the connector assembly CA as shown in FIG. 1 includes two plugs 160A and two plugs 160B. Each of the plugs 160A and each of the plugs 160B are configured to carry a current of approximately 60 amps or more. In other words, the connector assembly CA as shown in FIG. 1 can collectively carry a current of approximately 240 amps or more.

In some embodiments, the housing 120, the cover body 140, the housing 220, and the cover body 240 may be made of insulating materials. In some embodiments, the housing 120, the cover body 140, the housing 220, and the cover body 240 may be, for example, plastic, rubber or other suitable dielectric materials. However, the present disclosure is not intended to limit the materials of the housing 120, the cover body 140, the housing 220, and the cover body 240.

In some embodiments, the conductive terminals 110, the busbar 130A, the busbar 130B, the sleeve 150A, the sleeve 150B, the plug 160A, the plug 160B, the blocking portion 170A, the blocking portion 170B, the conductive terminal 210, the busbar 230A, the busbar 230B, the sleeve 250A, and the sleeve 250B may be made of conductive material. In some embodiments, the conductive terminal 110, the busbar 130A, the busbar 130B, the sleeve 150A, the sleeve 150B, the plug 160A, the plug 160B, the blocking portion 170A, the blocking portion 170B, the conductive terminal 210, the busbar 230A, the busbar 230B, the sleeve 250A, and the sleeve 250B may be, for example, copper or other suitable metal or conductive material. However, the present disclosure is not intended to limit the materials of the conductive terminal 110, the busbar 130A, the busbar 130B, the sleeve 150A, the sleeve 150B, the plug 160A, the plug 160B, the blocking portion 170A, the blocking portion 170B, the conductive terminal 210, the busbar 230A, the busbar 230B, the sleeve 250A, and the sleeve 250B.

Figure 2:
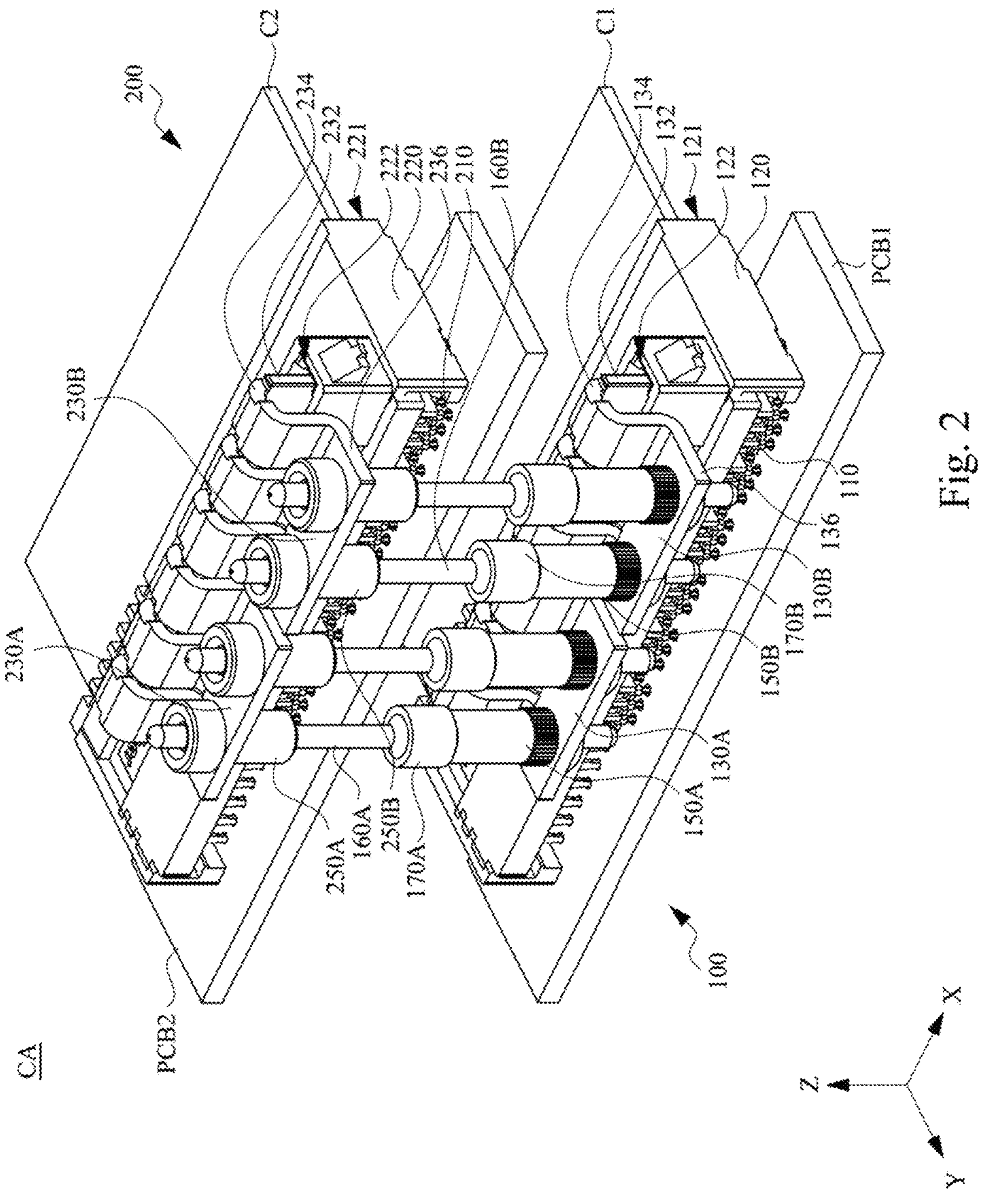
FIG. 2 is a perspective view of the connector assembly in accordance with an embodiment of the present disclosure.

Reference is made to FIG. 2. FIG. 2 is a perspective view of a connector assembly CA in accordance with an embodiment of the present disclosure. For simplicity, the cover body 140 and the cover body 240 are omitted in FIG. 2 with respect to FIG. 1. As shown in FIG. 2, in this embodiment, the housing 120 has a socket 121 on a side of the housing 120 and a socket 122 separated from the socket 121 on the other side of the housing 120. The socket 121 is configured to allow the expansion card C1 to insert along a direction (e.g., y-direction), and the expansion card C1 contacts the conductive terminal 110. The socket 122 is configured to allow an end of the busbar 130A and an end of the busbar 130B to insert along a direction (e.g., negative-z-direction), and the busbar 130A and the busbar 130B respectively contact the corresponding conductive terminals 110 in the housing 120. Similarly, the housing 220 has a socket 221 on a side of the housing 220 and a socket 222 separated from the socket 221 on the other side of the housing 220. The socket 221 is configured to allow the expansion card C2 to insert along a direction (e.g., y-direction), and the expansion card C2 contacts the conductive terminal 210. The socket 222 is configured to allow an end of the busbar 230A and an end of the busbar 230B to insert along a direction (e.g., negative-z-direction), and the busbar 230A and the busbar 230B respectively contact the corresponding conductive terminals 210 in the housing 220.

Reference is made again to FIG. 2. As shown in FIG. 2, in this embodiment, each of the busbar 130A and the busbar 130B includes one or more vertical extending portions 132, one or more bending portions 134, and a horizontal extending portion 136. The one or more vertical extending portions 132 contact the conductive terminals 110. The one or more bending portions 134 are connected to the one or more vertical extending portions 132. The horizontal extending portion 136 is connected to the one or more bending portions 134. The one or more bending portions 134 may have positioning structures (e.g., recesses) to facilitate positioning of the busbar 130A and the busbar 130B when the busbar 130A and the busbar 130B are installed in the housing 120. In detail, the one or more vertical extending portions 132 contact the conductive terminals 110. The horizontal extending portions 136 of the busbar 130A and the busbar 130B respectively contact the sleeve 150A and the sleeve 150B. Similarly, each of the busbar 230A and the busbar 230B includes one or more vertical extending portions 232, one or more bending portions 234, and a horizontal extending portion 236. The one or more vertical extending portions 232 contact the conductive terminals 210. The one or more bending portions 234 are connected to the one or more vertical extending portions 232. The horizontal extending portion 236 is connected to the one or more bending portions 234. The one or more bending portions 234 may have positioning structures (e.g., recesses) to facilitate positioning of the busbar 230A and the busbar 230B when the busbar 230A and the busbar 230B are installed in the housing 220. In detail, the one or more vertical extending portions 232 contact the conductive terminals 210. The horizontal extending portions 236 of the busbar 230A and the busbar 230B respectively contact the sleeve 250A and the sleeve 250B.

Figure 3:
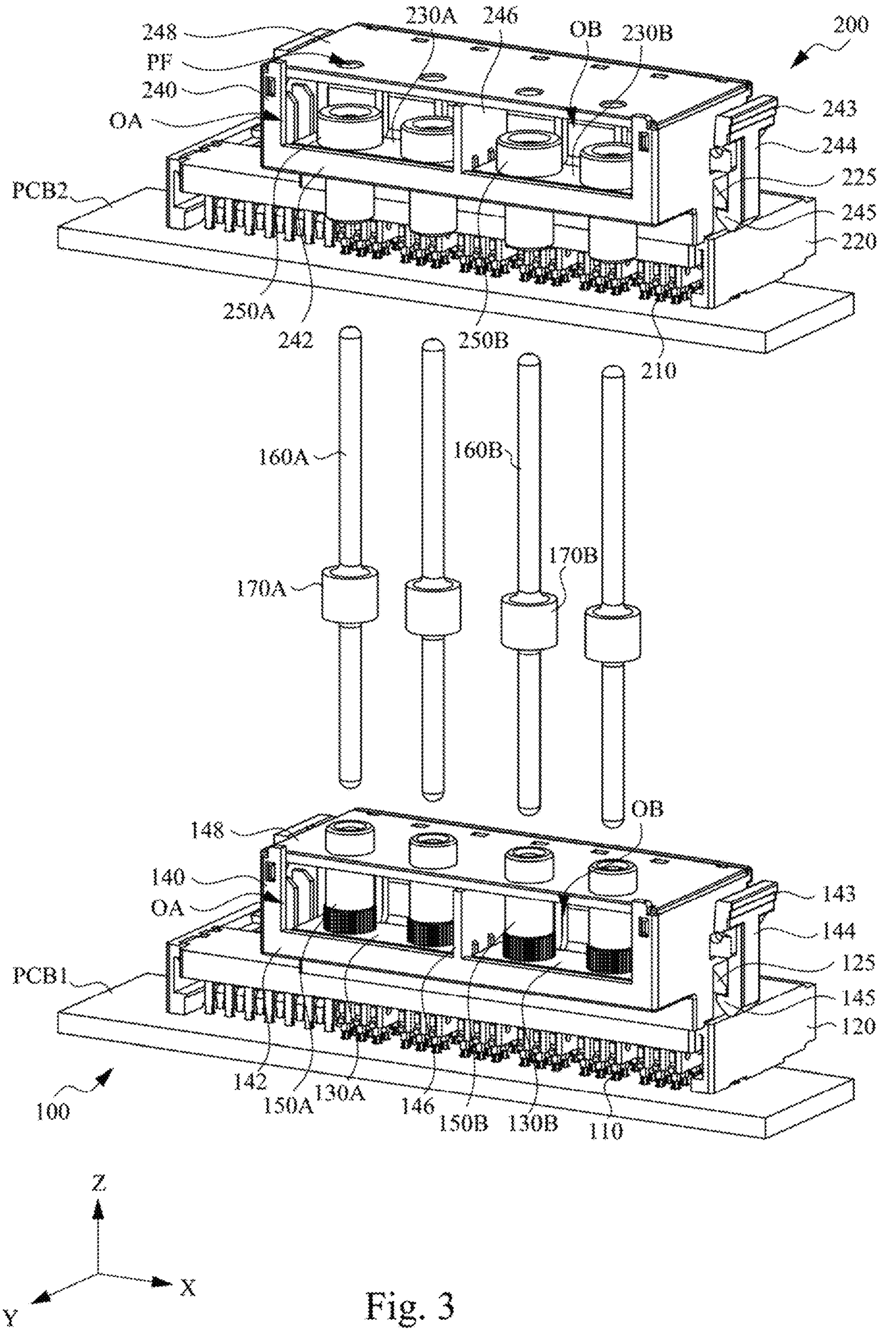
FIG. 3 is an exploded view of the connector assembly in accordance with an embodiment of the present disclosure.

Reference is made to FIG. 3. FIG. 3 is an exploded view of the connector assembly CA in accordance with an embodiment of the present disclosure. As shown in FIG. 3, in this embodiment, the plug 160A and the plug 160B are extended along a direction (e.g., z-direction). A portion of the plug 160A that is lower than the blocking portion 170A passes through the sleeve 150A, and a portion of the plug 160A that is higher than the blocking portion 170A is configured to pass through the sleeve 250A. Similarly, a portion of the plug 160B that is lower than the blocking portion 170B passes through the sleeve 150B, and a portion of the plug 160B that is higher than the blocking portion 170B is configured to pass through the sleeve 250B. A plurality of perforations PF may be formed on the top plate 248 and are aligned with the hollowed through holes of the sleeve 250A and the sleeve 250B in a vertical direction. A diameter of the perforations PF can be slightly greater than a diameter of the end of the plug 160A and the plug 160B, so that portions of the plug 160A and the plug 160B that pass through the sleeve 250A and the sleeve 250B can also pass through the perforations PF, thereby the plug 160A and the plug 160B cooperating with applications of different spacing between the circuit board PCB1 and the circuit board PCB2.

Reference is made again to FIG. 3. In a usage scenario, firstly, the user can install the conductive terminals 110 and the housing 120 on the circuit board PCB1. Next, the user installs the busbar 130A, the busbar 130B, the sleeve 150A, the sleeve 150B, and the cover body 140 on the housing 120, and enables the cover body 140 to be engaged with the housing 120. Next, the user can install the conductive terminals 210 and the housing 220 on the circuit board PCB2. Next, the user installs the busbar 230A, the busbar 230B, the sleeve 250A, the sleeve 250B, and the cover body 240 on the housing 220, and enables the cover body 240 to be engaged with the housing 220. Next, the user installs the plug 160A on the sleeve 150A, and also installs the plug 160B on the sleeve 150B, and allows the blocking portion 170A and the blocking portion 170B to respectively abut against a top portion of the sleeve 150A and a top portion of the sleeve 150B. Next, the user installs the connector 200 disposed on the circuit board PCB2 to the plug 160A and the plug 160B, allows the plug 160A to pass through the sleeve 250A, and allows the plug 160B to pass through the sleeve 250B. Finally, the user fixes the circuit board PCB2 to a chassis (not shown), thereby completing the assembly of the connector assembly CA as shown in FIG. 1 to FIG. 3. In some embodiments, the blocking portion 170A and the blocking portion 170B can abut against or be fixed on the connector 100. For example, the blocking portion 170A and the blocking portion 170B abut against a top surface of the cover body 140 or buckle to be fixed on the cover body 140.

Figure 4:
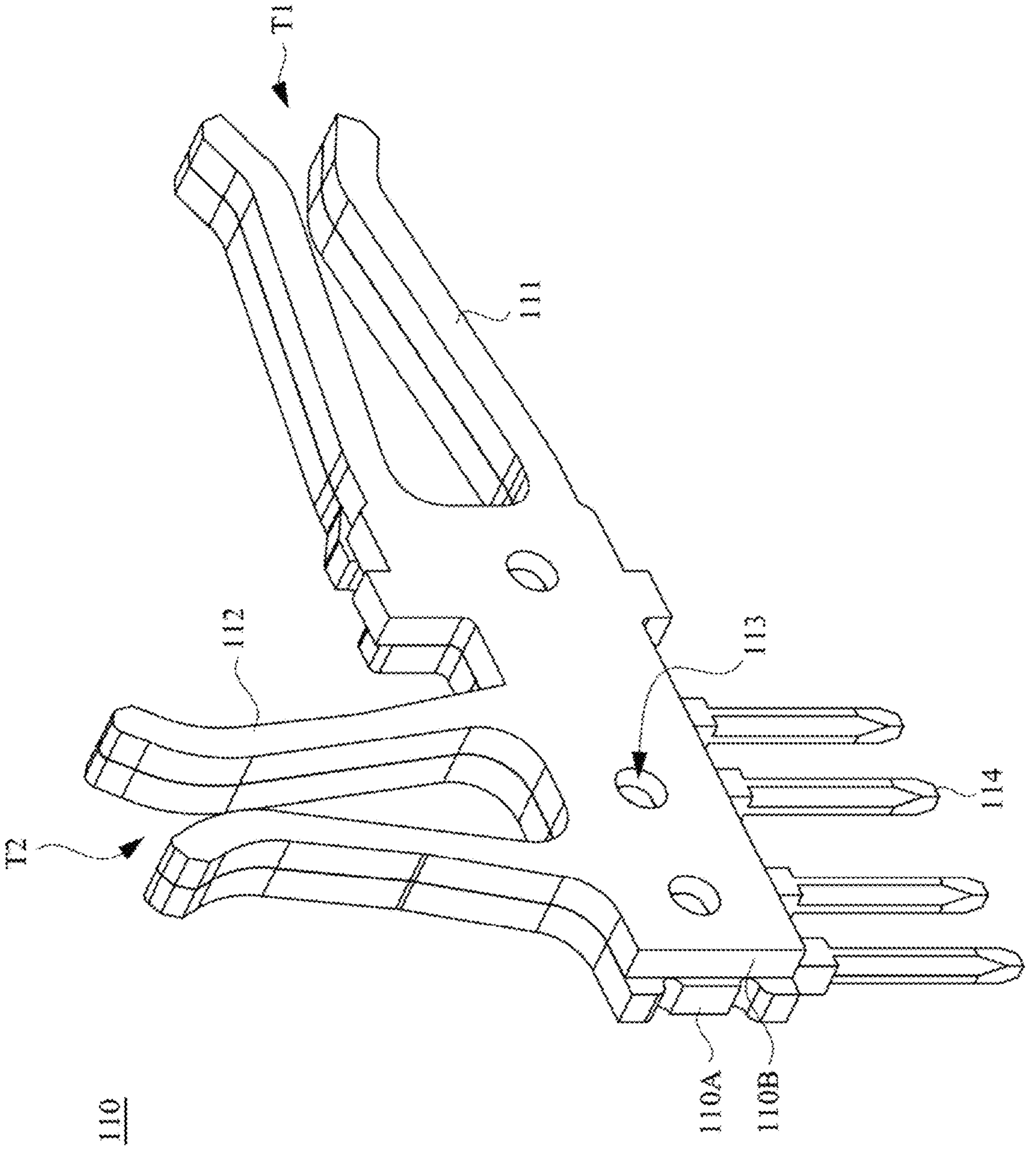
FIG. 4 is a perspective view of a conductive terminal in accordance with an embodiment of the present disclosure.
Figure 4:
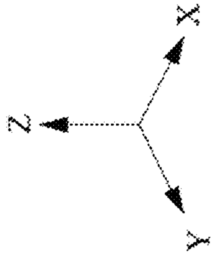

Reference is made to FIG. 4. FIG. 4 is a perspective view of the conductive terminal 110 in accordance with an embodiment of the present disclosure. It should be noted that since the structures of the conductive terminal 110 and the conductive terminal 210 are exactly the same, only the conductive terminal 110 will be described in detail herein. As shown in FIG. 4, in this embodiment, the conductive terminal 110 includes a fixed conductive terminal 110A and a floating conductive terminal 110B. The fixed conductive terminal 110A and the floating conductive terminal 110B are fixed to each other. The conductive terminal 110 includes a first end portion 111, a second end portion 112 separated from the first end portion 111, and a fixed structure 113 configured to fix the fixed conductive terminal 110A and the floating conductive terminal 110B. The fixed structure 113 is connected between the first end portion 111 and the second end portion 112. The first end portion 111 defines a first recessed portion T1 and the second end portion 112 defines a second recessed portion T2. The first end portion 111 corresponds to the socket 121 and the second end portion 112 corresponds to the socket 122. In this embodiment, as the expansion card C1 is inserted into the socket 121 of the housing 120, the first end portion 111 of the conductive terminal 110 clamps the expansion card C1 so that the expansion card C1 is accommodated in the first recessed portion T1. As the busbar 130A and the busbar 130B are inserted into the socket 122 of the housing 120, the second end portion 112 of the conductive terminal 110 clamps the vertical extending portions 132 of the busbar 130A and the busbar 130B so that portions of the vertical extending portions 132 can be accommodated in the second recessed portion T2. As shown in FIG. 4, the fixed conductive terminal 110A and the floating conductive terminal 110B are substantially conformal. The difference in between is that the fixed conductive terminal 110A further includes a welding pin 114 compared with the floating conductive terminal 110B, and the welding pin 114 is connected to the fixed structure 113. The detailed structures of the fixed conductive terminals 110A and the floating conductive terminals 110B will be described below.

Figure 5B:
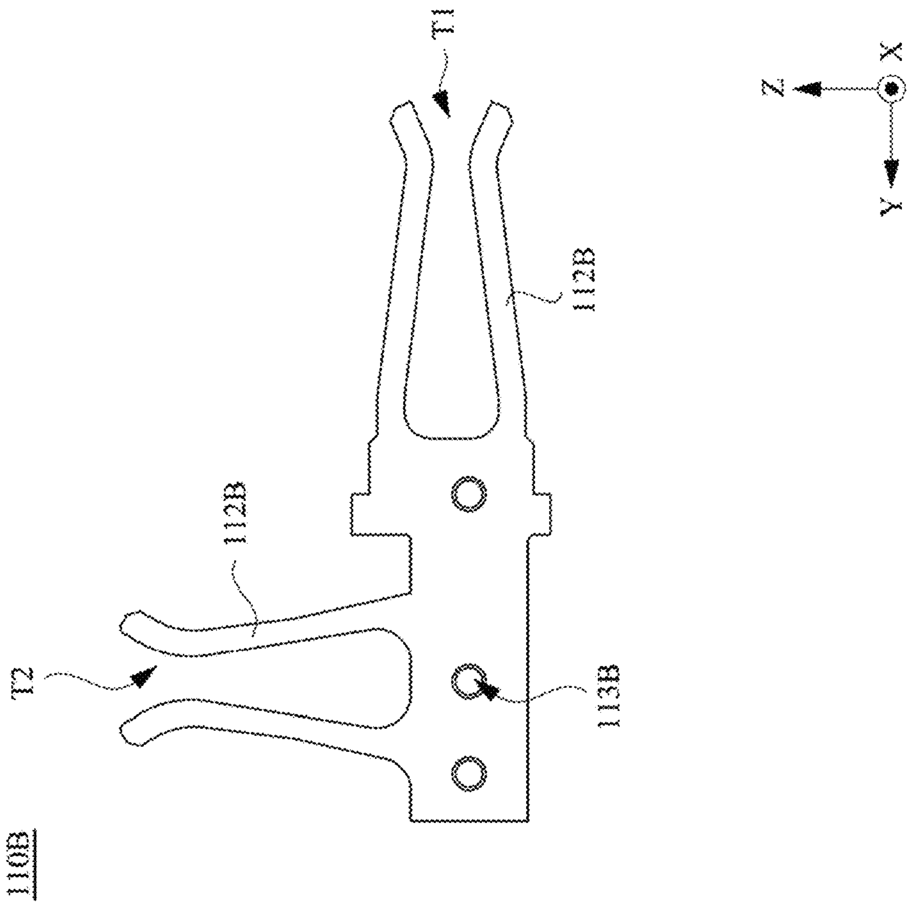
FIG. 5B is a schematic view of a floating conductive terminal in accordance with an embodiment of the present disclosure.
Figure 5A:
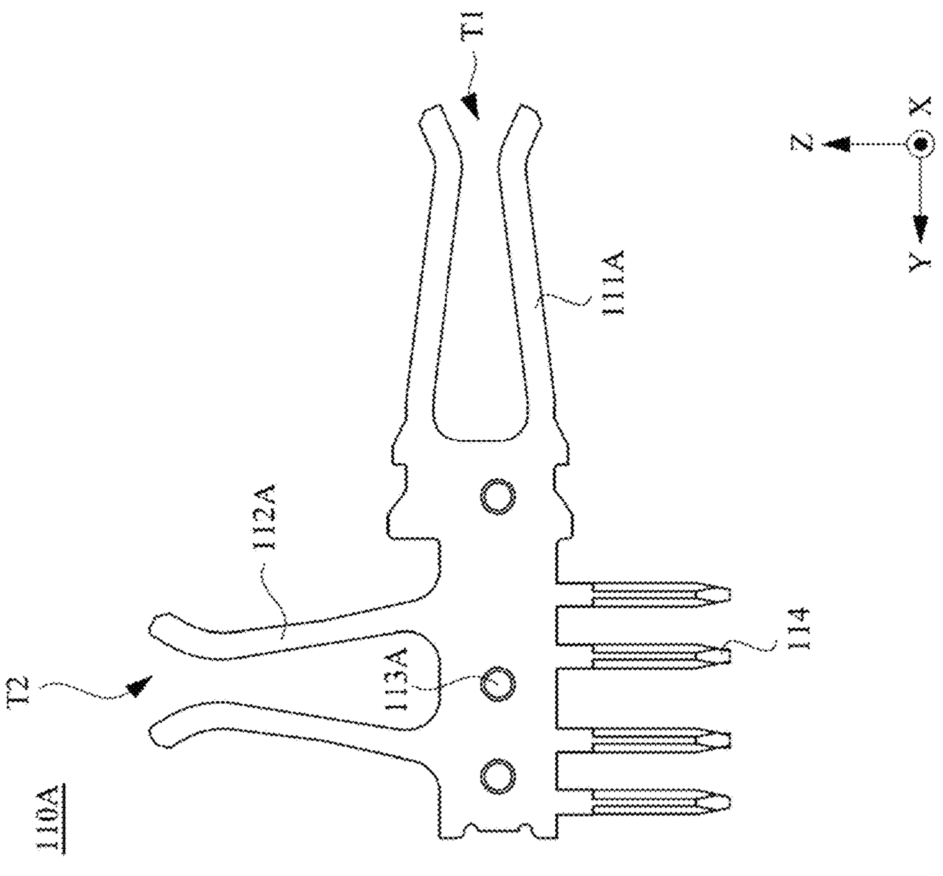
FIG. 5A is a schematic view of a fixed conductive terminal in accordance with an embodiment of the present disclosure.

Reference is made to FIG. 5A and FIG. 5B. FIG. 5A is a schematic view of the fixed conductive terminal 110A in accordance with an embodiment of the present disclosure. FIG. 5B is a schematic view of the floating conductive terminal 110B in accordance with an embodiment of the present disclosure. As shown in FIG. 5A and FIG. 5B, in this embodiment, the fixed conductive terminal 110A includes a first end portion 111A, a second end portion 112A, a fixed portion 113A and the welding pin 114. The fixed conductive terminal 110A may be integrally formed, and the first end portion 111A, the second end portion 112A, the fixed portion 113A, and the welding pin 114 are coplanar. The first end portion 111A and the second end portion 112A respectively define the first recessed portion T1 and the second recessed portion T2. The fixed conductive terminal 110A is welded to the circuit board PCB1 by the welding pin 114. The floating conductive terminal 110B includes a first end portion 111B, a second end portion 112B, and a fixed portion 113B. The floating conductive terminal 110B may be integrally formed, and the first end portion 111B, the second end portion 112B, and the fixed portion 113B are coplanar. The first end portion 111B and the second end portion 112B respectively define the first recessed portion T1 and the second recessed portion T2. The fixed conductive terminal 110A and the floating conductive terminal 110B are fixed to each other by riveting the fixed portion 113A and the fixed portion 113B, respectively. By such structural design, a contact area of the conductive terminal 110 can be increased to conduct more current. In detail, the contact area of each of the conductive terminals 110 contacting the expansion card C1 in the socket 121 is widened, and the contact area of each of the conductive terminals 110 contacting the vertical extending portions 132 in the socket 122 is also widened.

As shown in FIG. 4, FIG. 5A, and FIG. 5B, since merely the fixed conductive terminal 110A includes the welding pin 114, when the conductive terminal 110 is disposed on the circuit board PCB1, the fixed conductive terminal 110A directly contacts the circuit board PCB1 and the floating conductive terminal 110B does not directly contact the circuit board PCB1.

In some embodiments, the conductive terminal 110 may include a plurality of fixed conductive terminals 110A fixed to each other or a plurality of floating conductive terminals 110B fixed to each other (that is, the electrical signals of the expansion card does not reach the circuit board where the connector is located). In some embodiments, the terminals of one of the connector 100 and the connector 200 may be two or more floating conductive terminals 110B fixed to each other, whereas the terminals of the other connector may be fixed conductive terminals 110A, so that the electrical signals of the expansion card C1 and the expansion card C2 are collectively provided to one of the circuit board PCB1 and the circuit board PCB2.

Figure 6:
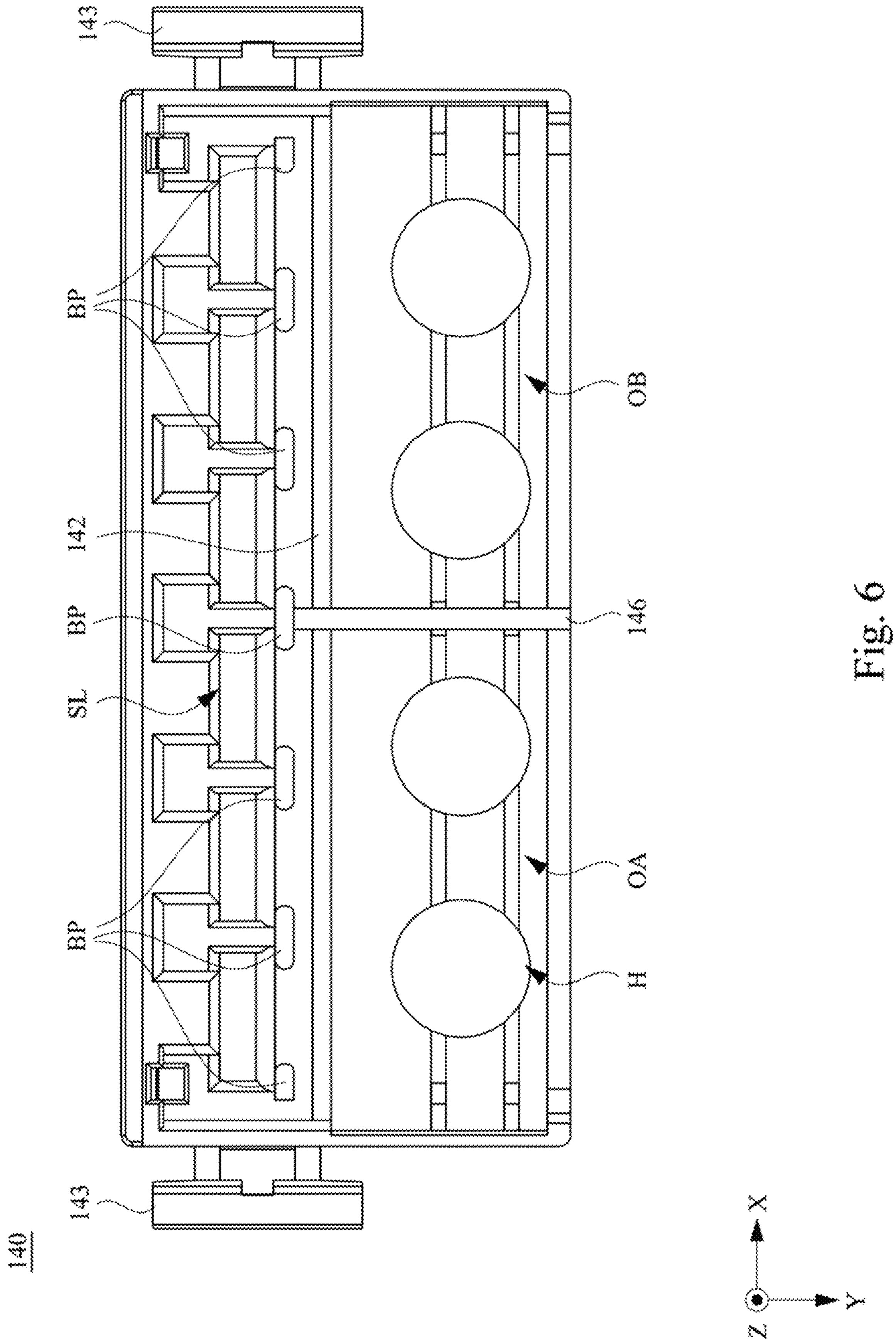
FIG. 6 is a top view of a cover body in accordance with an embodiment of the present disclosure.

Reference is made to FIG. 6. FIG. 6 is a top view of the cover body 140 in accordance with an embodiment of the present disclosure. For simplicity, the top plate 148 is omitted in FIG. 6. It should be noted that since the structures of the cover body 140 and the cover body 240 are similar, only the cover body 140 is taken as an example for detailed description herein. As shown in FIG. 6, in this embodiment, the cover main body 142 of the cover body 140 further has a plurality of slots SL and a plurality of holes H. The slots SL are configured to allow the busbar 130A and the busbar 130B to pass through. The holes H are configured to allow the sleeve 150A and the sleeve 150B to pass through. In some embodiments, the sleeve 150A and the sleeve 150B are respectively fixed on the cover body 140 by friction between the sleeve 150A and an inner surface of the opening H and the friction of the sleeve 150B and the inner surface of the opening H. In some embodiments, the cover main body 142 further includes a plurality of positioning parts BP (e.g., bumps) to mate with the positioning structures of the bending portions 134 of the busbar 130A and the busbar 130B, thereby positioning the busbars 130A and the busbars 130B. 130B is positioned within the cover body 140.

Figure 7:
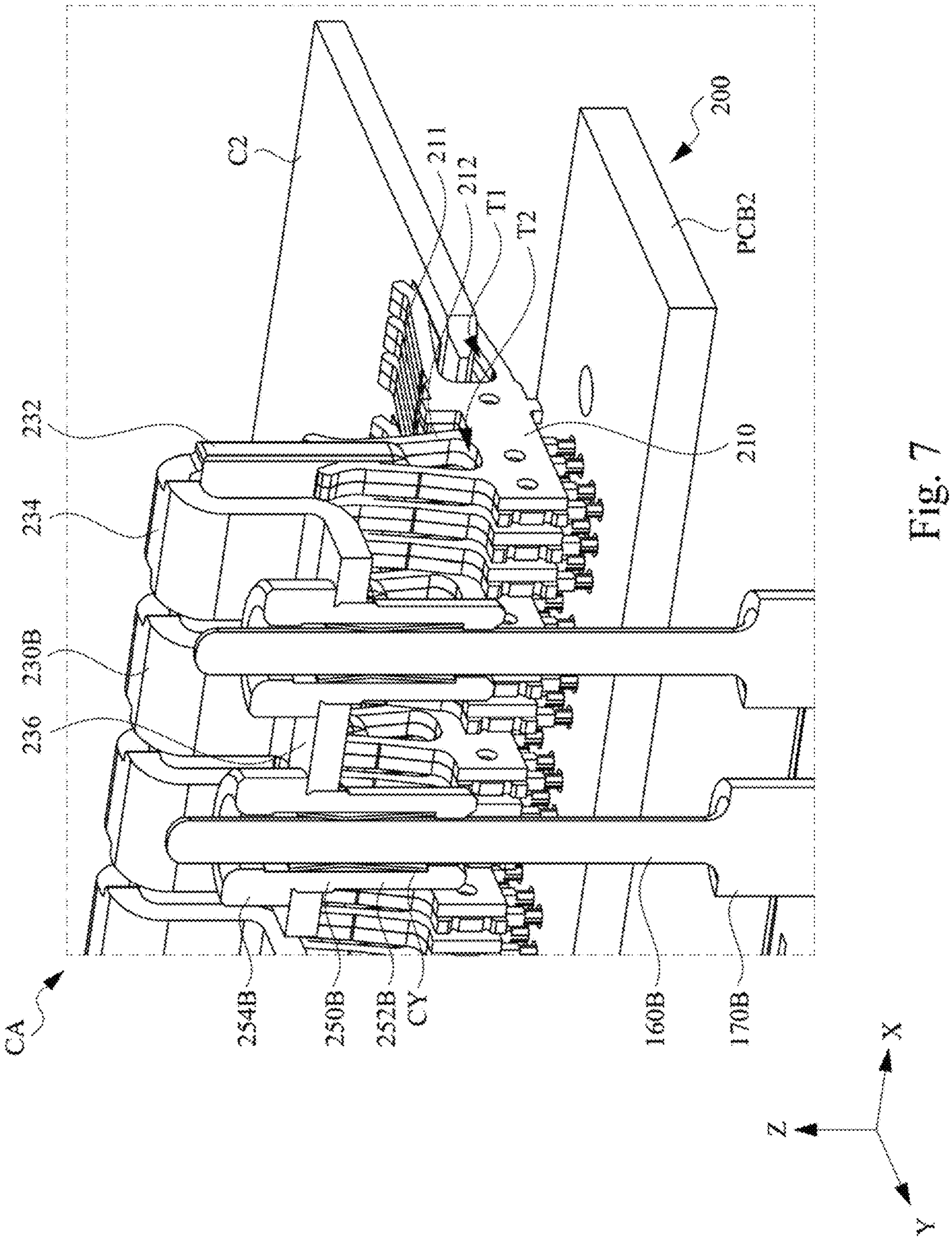
FIG. 7 is a cross-sectional schematic view of a sleeve, a plug, and a crown spring in accordance with an embodiment of the present disclosure.

Reference is made to FIG. 7. FIG. 7 is a cross-sectional schematic view of the sleeve 250B, the plug 160B, and a crown spring CY in accordance with an embodiment of the present disclosure. For simplicity, the housing 220 and the cover body 240 are omitted in FIG. 7. As shown in FIG. 7, in this embodiment, the connector assembly CA further includes the crown spring CY surrounding an inner surface of the hollowed through hole of the sleeve 150A, an inner surface of the hollowed through hole of the sleeve 150B, and an inner surface of the hollowed through hole of the sleeve 250A, and an inner surface of the hollowed through hole of the sleeve 250B. It should be noted that since the connection relationships between the sleeve 150A and the plug 160A, the sleeve 250A and the plug 160A, the sleeve 150B and the plug 160B, and the sleeve 250B and the plug 160B are similar, only the sleeve 250B and the plug 160B will be described in detail herein as examples. As shown in FIG. 7, the crown spring CY clamps the plug 160B. The crown spring CY contacts the sleeve 250B and the plug 160B.

Reference is made again to FIG. 7. As shown in FIG. 7, in this embodiment, the conductive terminal 210 includes a first end portion 211 and a second end portion 212 separated from the first end portion 211. The first end portion 211 corresponds to the socket 221 of the housing 220 and the second end portion 212 corresponds to the socket 222 of the housing 220 (not shown in FIG. 7). As shown in FIG. 2 and FIG. 7, in this embodiment, when the expansion card C2 is inserted into the socket 221 of the housing 220, the first end portion 211 of the conductive terminal 210 clamps the expansion card C2 and allows a portion of the expansion card C2 is accommodated in the first recessed portion T1. When the busbar 230A and the busbar 230B are inserted into the socket 222 of the housing 220, the second end portion 212 of the conductive terminal 210 clamps the vertical extending portions 232 of the busbar 230A and the busbar 230B so that portions of the vertical extending portions 232 are accommodated in the second recessed portion T2. As shown in FIG. 7, the sleeve 250B includes a sleeve main body 252B and a cap portion 254B, and the hollowed through hole of the sleeve 250B runs through the sleeve main body 252B and the cap portion 254B. The sleeve main body 252B is connected to the busbar 230B. The cap portion 254B is located on a top portion of the sleeve main body 252B and bears against a surface of the busbar 230B. In some embodiments, a diameter of cap portion 254B is greater than a diameter of the sleeve main body 252B. As shown in FIG. 7, the sleeve main body 252B is fixed relative to the busbar 230B by friction between the sleeve main body 252B and the busbar 230B. The sleeve 250B is coupled to the horizontal extending portion 236 of the busbar 230B. In detail, the sleeve main body 252B has rough texture, and the horizontal extending portion 236 has a mounting hole that is generally consistent in shape with the sleeve main body 252B but slightly smaller than the sleeve main body 252B. When the sleeve 250B is fitted into the mounting hole of the horizontal extending portion 236, the rough texture will generate a hard interference with the surface of the mounting hole to fix the sleeve 250B on the busbar 230B.

Figure 8:
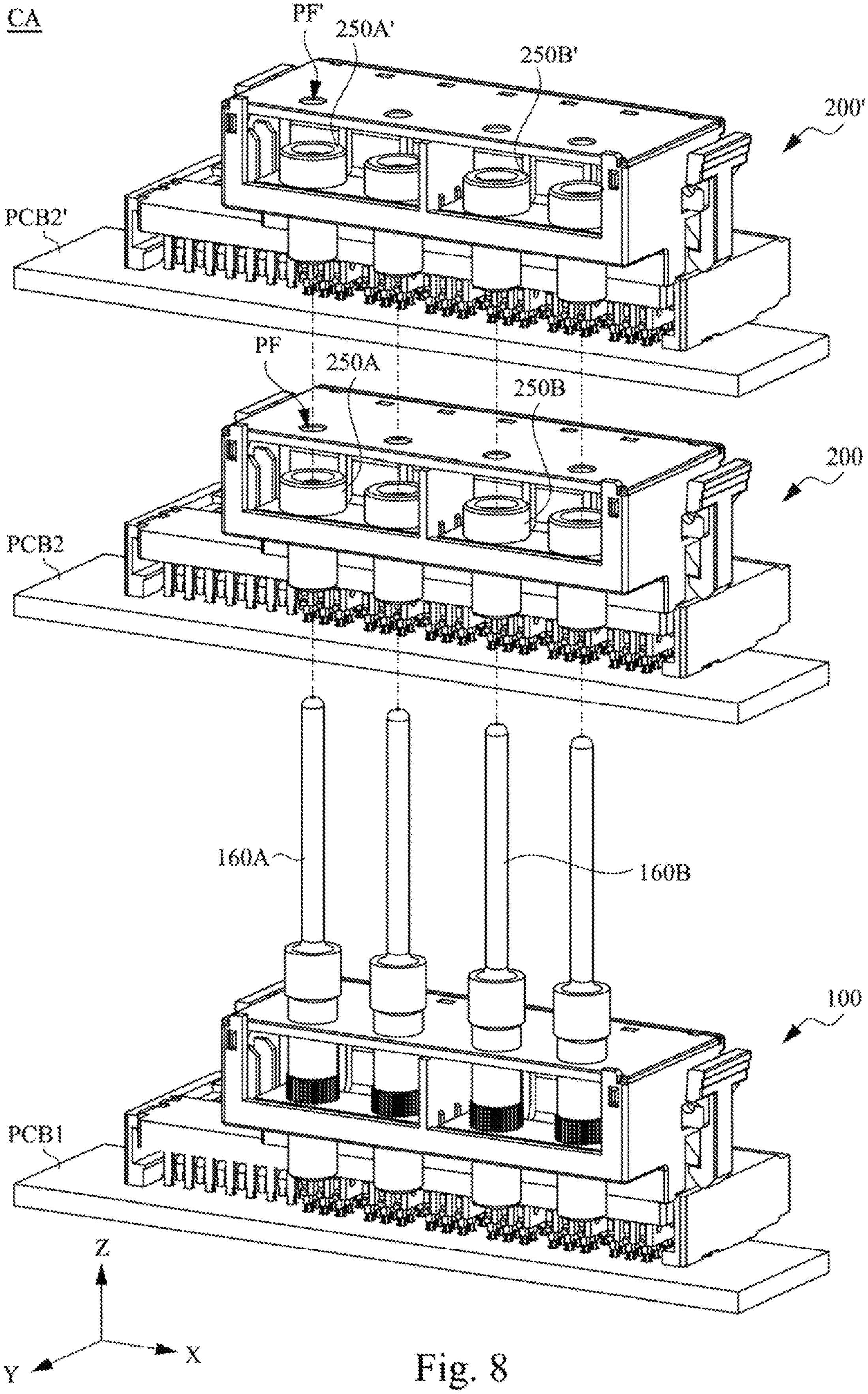
FIG. 8 is an exploded view of the connector assembly in accordance with an embodiment of the present disclosure.

Reference is made to FIG. 8. FIG. 8 is an exploded view of the connector assembly CA in accordance with an embodiment of the present disclosure. As shown in FIG. 8, in this embodiment, the connector assembly CA not only includes the circuit board PCB1, the connector 100, the circuit board PCB2, the connector 200, the plug 160A, and the plug 160B, but also includes a circuit board PCB2' and a connector 200'. The connector 200' is disposed on the circuit board PCB2'. The connector 200' includes a sleeve 250A' and a sleeve 250B' and has perforations PF'. Since the structure of the connector 200' is exactly the same as that of the connector 200, the detail will not described again herein. As shown in FIG. 8, the plug 160A is configured to pass through the sleeve 250A of the connector 200 and the sleeve 250A' of the connector 200', and the plug 160B is configured to pass through the sleeve 250B of the connector 200 and the sleeve 250' of the connector 200'.

Reference is made again to FIG. 8. In a usage scenario, firstly, the user installs the plug 160A and the plug 160B on the connector 100. Next, the user installs the connector 200 disposed on the circuit board PCB2 to the plug 160A and the plug 160B, allows the plug 160A to pass through the sleeve 250A and the perforations PF of the connector 200, and allows the plug 160B to pass through the sleeve 250B and the perforations PF. Next, the user installs the connector 200' disposed on the circuit board PCB2' to the plug 160A and the plug 160B, allows the plug 160A to pass through the sleeve 250A', and allows the plug 160B to pass through the sleeve 250B'. Finally, the user fixes the circuit board PCB2 and the circuit board PCB2' to the chassis (not shown), thereby completing the assembly of the connector assembly CA as shown in FIG. 8. As shown in FIG. 8, in this embodiment, the plug 160A and the plug 160B can pass through two, three, or more connectors along a direction (e.g., z-direction), thereby realizing the connection of the plurality of connectors in a vertical direction.

Figure 9:
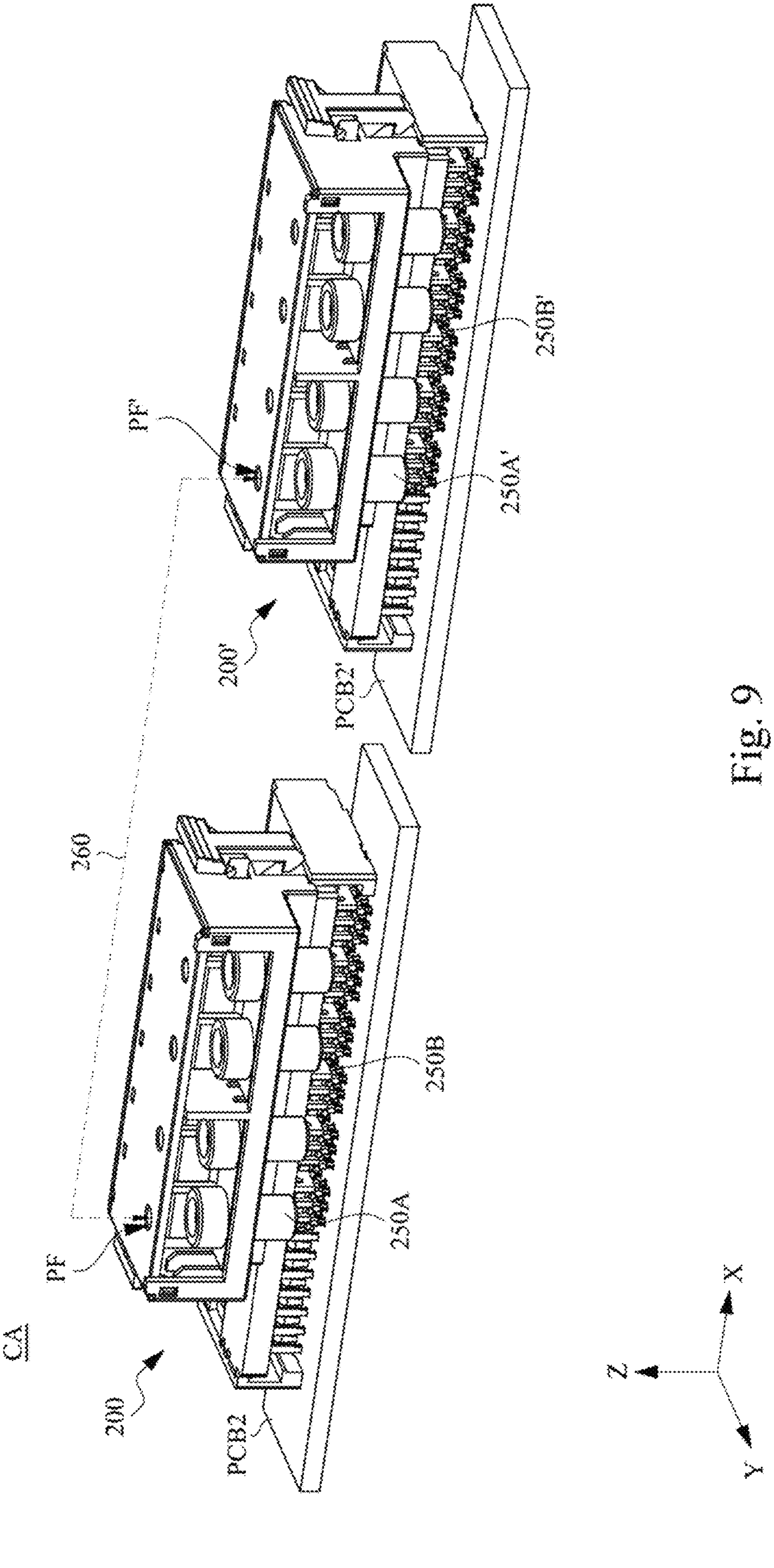
FIG. 9 is a perspective view of the connector assembly in accordance with an embodiment of the present disclosure.

Reference is made to FIG. 9. FIG. 9 is a perspective view of the connector assembly CA in accordance with an embodiment of the present disclosure. The structural configuration of the connector assembly CA in FIG. 8 is generally similar to the structural configuration of the connector assembly CA in FIG. 9. The difference in between is that the connector 200 and the connector 200' of the connector assembly CA in FIG. 9 are arranged in a horizontal direction (e.g., x-direction). As shown in FIG. 9, in this embodiment, the connector assembly CA not only includes the circuit board PCB2, the connector 200, the circuit board PCB2', and the connector 200', but also includes a plug 260. Specifically, the plug 260 may be implemented in an inverted U-shape, for example. In some embodiments, an end of the plug 260 passes through the perforations PF and the sleeve 250A, and the other end of the plug 260 passes through the perforations PF' and the sleeve 250A', thereby realizing the connection of the plurality of connectors in the horizontal direction.

Figure 10:
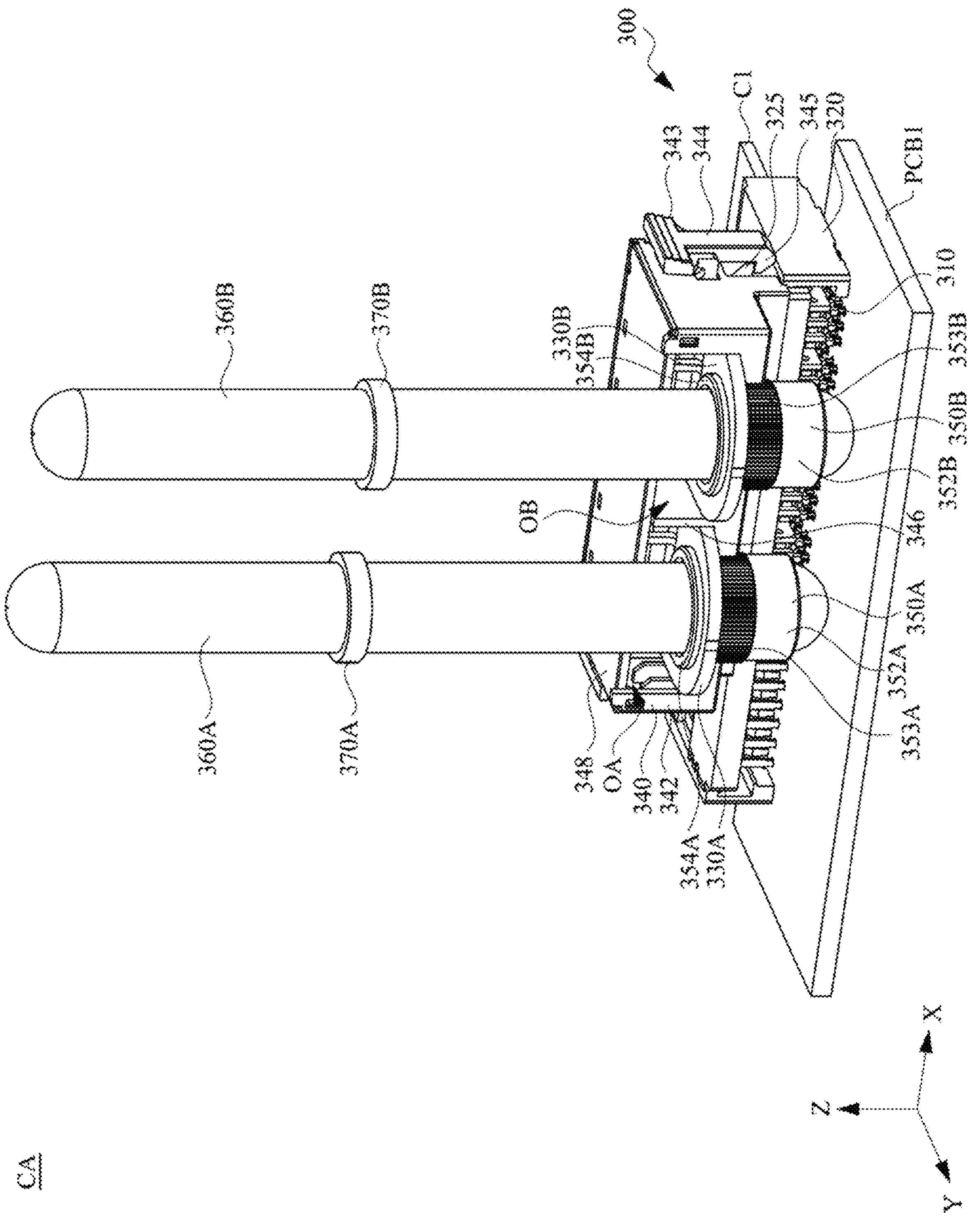
FIG. 10 is a perspective view of the connector assembly in accordance with another embodiment of the present disclosure.

Reference is made to FIG. 10. FIG. 10 is a perspective view of the connector assembly CA in accordance with another embodiment of the present disclosure. As shown in FIG. 10, in this embodiment, the connector assembly CA includes the circuit board PCB1, a connector 300, a plug 360A, a plug 360B, a blocking portion 370A, and a blocking portion 370B. The connector 300 is disposed on the circuit board PCB1. The connector 300 is configured to allow the expansion card C1 to insert. The plug 360A and the plug 360B pass through the connector 300. The connector 300 includes a conductive terminal 310, a housing 320, a busbar 330A, a busbar 330B, a cover body 340, a sleeve 350A, and a sleeve 350B. The connector 300 is disposed on the circuit board PCB1. The housing 320 wraps a plurality of conductive terminals 310. The housing 320 is configured to allow the expansion card C1 to insert. The busbar 330A and the busbar 330B are connected to the plurality of conductive terminals 310. The cover body 340 wraps at least a portion of the busbar 330A and the busbar 330B, that is, the busbar 330A and the busbar 330B extend a longer distance backwardly (y-direction). The sleeve 350A and the sleeve 350B are respectively connected to an end of the busbar 330A and an end of the busbar 330B (including a portion exposed to the cover body 340). By such structural design, a size of the sleeve 350A and the sleeve 350B is greater than a size of the sleeve 150A and the sleeve 150B in the aforementioned embodiment, thereby improving an ampacity (the maximum current conduction capability). As shown in FIG. 10, the housing 320 includes a barb 325. The cover body 340 includes a cover main body 342, a buckle structure, and a top plate 348. The buckle structure is configured to be buckled with the barb 325. The buckle structure includes a pressing portion 343, a connecting arm 344, and a hook 345. The pressing portion 343 is disposed on a side surface of the cover main body 342. The pressing portion 343 and the hook 345 are located at both ends of the connecting arm 344. In other words, the connecting arm 344 is connected between the hook 345 and the pressing portion 343. The pressing portion 343 and the hook 345 seesaw relative to the cover main body 342. The top plate 348 covers the cover main body 342. The cover body 340 may also include a partitioning portion 346 disposed between the cover main body 342 and the top plate 348 to electrically isolate the busbar 330A and the busbar 330B. The partitioning portion 346, the cover main body 342, and the top plate 348 jointly define two accommodating cavities to respectively accommodate the busbar 330A and the busbar 330B. Each of the two accommodating cavities forms an opening OA and an opening OB on the cover body 340. In detail, the partitioning portion 346 divides a space formed by the cover main body 342 and the top plate 348 into the two accommodating cavities that have the opening OA and the opening OB respectively for heat dissipation. As shown in FIG. 1, the housing 320 and the cover body 340 are engaged with each other by the barb 325 and the hook 345, respectively. The sleeve 350A and the sleeve 350B are respectively located in an end of the busbar 330A and an end of the busbar 330B outside the two accommodating cavities of the cover body 340.

Reference is made again to FIG. 10. As shown in FIG. 10, in this embodiment, the plug 360A passes through the sleeve 350A of the connector 300. The plug 360B passes through the sleeve 350B of the connector 300. The blocking portion 370A is disposed on the plug 360A. The blocking portion 370B is disposed on the plug 360B. In detail, the blocking portion 370A and the blocking portion 370B are respectively located at the middle section of the plug 360A and the middle section of the plug 360B. In some embodiments, a diameter of the blocking portion 370A is greater than a diameter of the plug 360A, and a diameter of the blocking portion 370B is greater than a diameter of the plug 360B. In a usage scenario, the user allows an end of the plug 360A and an end of the plug 360B to pass through the sleeve 350A and the sleeve 350B from top to bottom, so that the sleeve 350A abuts against the blocking portion 370A and is positioned, and the sleeve 350B abuts against the blocking portion 370B and is positioned. Next, when the user wants to install another connector on the plug 360A and the plug 360B, two sleeves (not shown) of the another connector pass through the other ends of the plug 360A and the plug 360B respectively, thereby enabling the plug 360A and the plug 360B to be connected between two connectors 300.

In some embodiments, the connector 300 may be, for example, a card-edge connector or other similar connector.

In some embodiments, the busbar 330A is configured as a positive busbar, and the busbar 330B is configured as a negative busbar. Therefore, the sleeve 350A and the plug 360A transmit current to the circuit board PCB1, whereas the sleeve 350B and the plug 360B receive current from the circuit board PCB1.

In some embodiments, the connector assembly CA as shown in FIG. 10 includes one plug 360A and one plug 360B. Each of the plug 360A and the plug 360B is configured to carry a current of approximately 250 amps or more. In other words, the connector assembly CA as shown in FIG. 10 can collectively transmit a current of approximately 500 amps or more.

In some embodiments, the housing 320 and the cover body 340 may be made of insulating materials. In some embodiments, the housing 320 and the cover body 340 may be made of plastic, rubber, or other suitable dielectric materials, for example. However, the present disclosure is not intended to limit the materials of the housing 320 and the cover body 340.

In some embodiments, the conductive terminal 310, the busbar 330A, the busbar 330B, the sleeve 350A, the sleeve 350B, the plug 360A, the plug 360B, the blocking portion 370A, and the blocking portion 370B may be conductive materials. In some embodiments, the conductive terminal 310, the busbar 330A, the busbar 330B, the sleeve 350A, the sleeve 350B, the plug 360A, the plug 360B, the blocking portion 370A, and the blocking portion 370B may be, for example, copper or other suitable metal or conductive materials. However, the present disclosure is not intended to limit the materials of the conductive terminals 310, the busbar 330A, the busbar 330B, the sleeve 350A, the sleeve 350B, the plug 360A, the plug 360B, the blocking portion 370A, and the blocking portions 370B.

Figure 11:
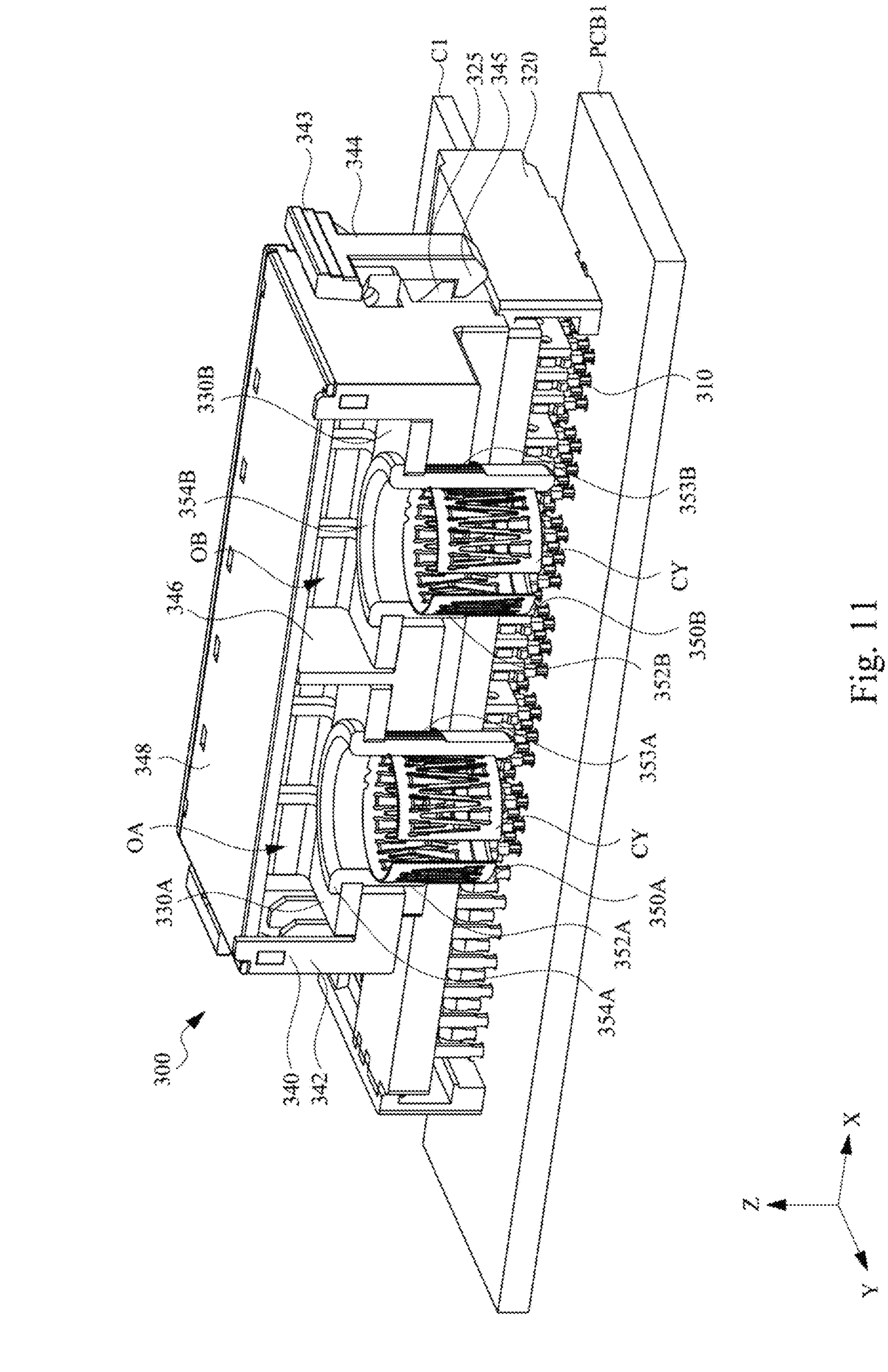
FIG. 11 is a cross-sectional schematic view of a connector in accordance with an embodiment of the present disclosure.

Reference is made to FIG. 11. FIG. 11 is a cross-sectional schematic view of the connector 300 according to another embodiment of the present disclosure. Although the crown spring CY goes through the cross-section, for simplicity, the crown spring CY is shown in its entirety. As shown in FIG. 11, in this embodiment, the connector assembly CA further includes a crown spring CY surrounding an inner surface of the hollowed through hole of the sleeve 350A and an inner surface of the hollowed through hole of the sleeve 350B. The crown spring CY in FIG. 11 is configured as shown in FIG. 7 to clamp the plug 360A and the plug 360B. In other words, crown spring CY contacts the sleeve 350A and the plug 360A, and the crown spring CY contacts the sleeve 350B and the plug 360B. The sleeve 350A includes a sleeve main body 352A, an interfering portion 353A, and a cap portion 354A. The sleeve main body 352A is connected to the busbar 330A. The cap portion 354A is located on a top portion of the sleeve main body 352A and bears against a surface of the busbar 330A. The interfering portion 353A is disposed on the sleeve main body 352A. The interfering portion 353A is engaged with the busbar 330A. Specifically, an outer surface of the interfering portion 353A has rough texture, so that the interfering portion 353A and the busbar 330A can be fastened to each other. In some embodiments, a diameter of the cap portion 354A is greater than a diameter of the sleeve main body 352A. The sleeve 350B includes a sleeve main body 352B, an interfering portion 353B, and a cap portion 354B. The sleeve main body 352B is connected to the busbar 330B. The cap portion 354B is located on a top portion of the sleeve main body 352B and bears against a surface of the busbar 330B. The interfering portion 353B is disposed on the sleeve main body 352B. The interfering portion 353B is engaged with the busbar 330B. Specifically, an outer surface of the interfering portion 353B has rough texture, so that the interfering portion 353B and the busbar 330B can be fastened to each other. In some embodiments, a diameter of the cap portion 354B is greater than a diameter of the sleeve main body 352B.

Figure 12:
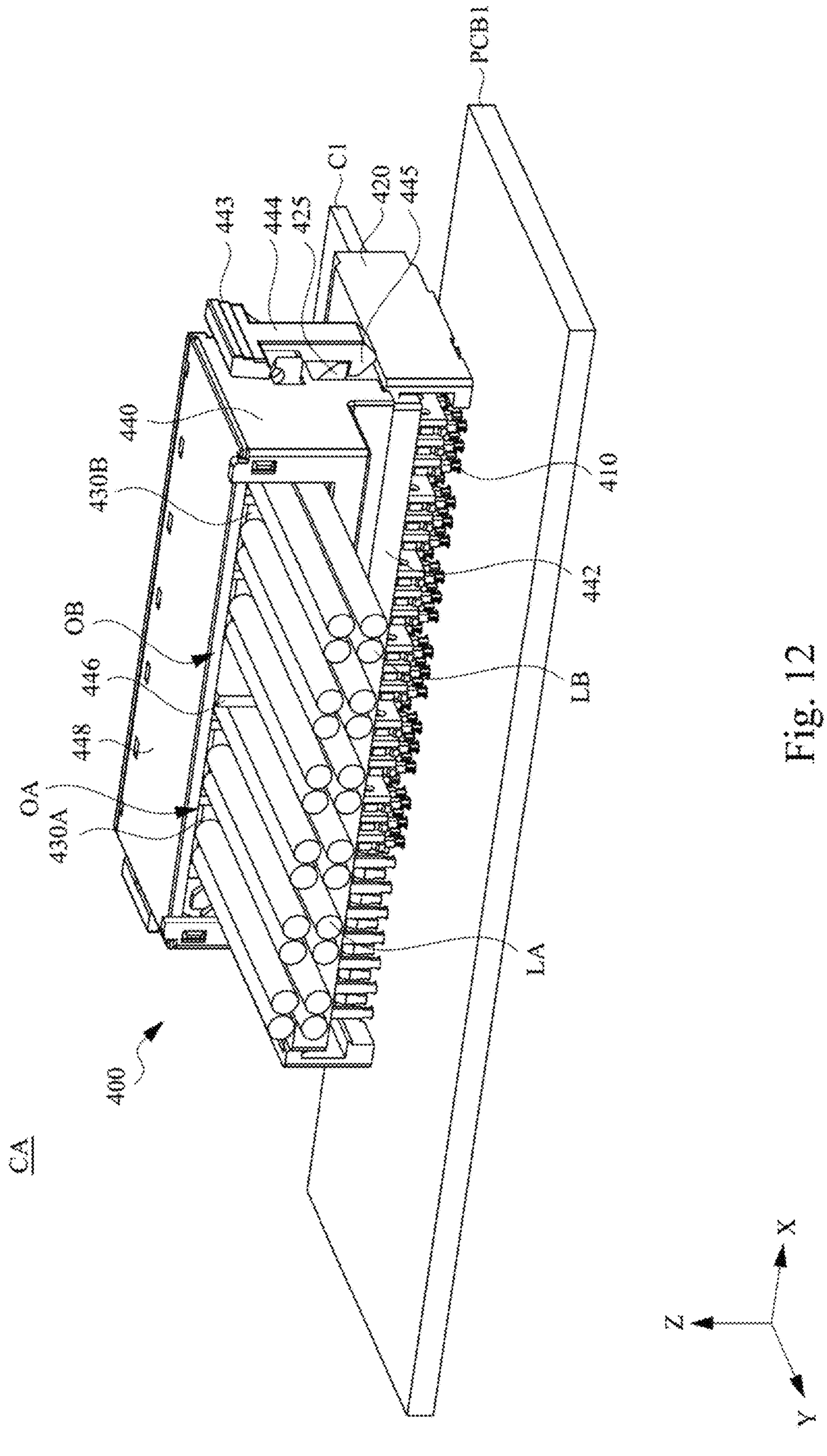
FIG. 12 is a perspective view of the connector assembly in accordance with yet another embodiment of the present disclosure.

Reference is made to FIG. 12. FIG. 12 is a perspective view of the connector assembly CA in accordance with yet another embodiment of the present disclosure. As shown in FIG. 12, in this embodiment, the connector assembly CA includes the circuit board PCB1, a connector 400, a cable LA, and a cable LB. The connector 400 is disposed on the circuit board PCB1. The connector 400 is configured to allow the expansion card C1 to insert. The connector 400 includes a conductive terminal 410, a housing 420, a busbar 430A, a busbar 430B, and a cover body 440. The connector 400 is disposed on the circuit board PCB1. The housing 420 wraps the plurality of conductive terminals 410. The housing 420 is configured to allow the expansion card C1 to insert. The busbar 430A and the busbar 430B are connected to the plurality of conductive terminals 410. The cover body 440 wraps the busbar 430A and the busbar 430B. The cable LA and the cable LB are connected to the busbar 430A and the busbar 430B, respectively. As shown in FIG. 12, the housing 420 includes a barb 425. The cover body 440 includes a cover main body 442, a buckle structure, and a top plate 448. The buckle structure is configured to be buckled with the barb 425. The buckle structure includes a pressing portion 443, a connecting arm 444, and a hook 445. The pressing portion 443 is disposed on a side surface of the cover main body 442. The pressing portion 443 and the hook 445 are located at both ends of the connecting arm 444. In other words, the connecting arm 444 is connected between the hook 445 and the pressing portion 443. The pressing portion 443 and the hook 445 seesaw relative to the cover main body 442. The top plate 448 covers the cover main body 442. The cover body 440 may also include a partitioning portion 446 disposed between the cover main body 442 and the top plate 448 to electrically isolate the busbar 430A and the busbar 430B. The partitioning portion 446, the cover main body 442, and the top plate 448 jointly define two accommodating cavities to respectively accommodate the busbar 430A and the busbar 430B. Each of the accommodating cavities forms an opening OA and an opening OB on the cover body 440. In detail, the partitioning portion 446 divides a space formed by the cover main body 442 and the top plate 448 into the two accommodating cavities that have the opening OA and the opening OB respectively for heat dissipation. The busbar 430A is separated from the busbar 430B by the partitioning portion 446. As shown in FIG. 12, the housing 420 and the cover body 440 are engaged with each other by the barb 425 and the hook 445, respectively. An end of the cable LA and an end of the cable LB connected with the busbar 430A and the busbar 430B are respectively located in the two accommodating cavities of the cover body 440.

In some embodiments, the connector 400 may be, for example, a card-edge connector or other similar connector.

In some embodiments, the busbar 430A is configured as a positive busbar, and the busbar 430B is configured as a negative bus. Therefore, the cable LA outputs a current and the cable LB receives the current.

In some embodiments, the housing 420 and the cover body 440 may be made of insulating materials. In some embodiments, the housing 420 and the cover body 440 may be made of plastic, rubber, or other suitable dielectric materials, for example. However, the present disclosure is not intended to limit the materials of the housing 420 and the cover body 440.

In some embodiments, the conductive terminal 410, the busbar 430A, and the busbar 430B may be conductive materials. In some embodiments, the conductive terminal 410, the busbar 430A, and the busbar 430B may be, for example, copper or other suitable metal or conductive material. However, the present disclosure is not intended to limit the materials of the conductive terminal 410, the busbar 430A, and the busbar 430B.

In some embodiments, the connector assembly CA as shown in FIG. 12 may include a plurality of circuit boards PCB1 and a plurality of connectors 400. These circuit boards PCB1 and these connectors 400 can be arranged in a vertical direction or a horizontal direction. For example, one of the circuit boards PCB1 can be configured as a mother board in the connector assembly CA, and the other circuit board PCB1 can be configured as a secondary board in the connector assembly CA. In this case, the connector assembly CA can receive the electrical signals of the expansion card C2 to the circuit board PCB1 as the mother board by the cable LA and the cable LB of the other circuit board PCB1, so as to process the electrical signals of the expansion card C1 and the expansion card C2 at the same time.

In some other embodiments, one of the circuit boards PCB1 and the other circuit board PCB1 can both be configured as secondary boards in the connector assembly CA. In this case, the connector assembly CA can be connected to the electrical signals of the expansion card C1 and the expansion card C2, and then transmit the electrical signals to the mother board at the same time, so as to process the electrical signals of the expansion card C1 and the expansion card C2 at the same time.

From the above detailed description of the specific embodiments of the present disclosure, it can be clearly seen that in the connector assembly and connector of the present disclosure, since the first cover body and the first housing are engaged with each other by the first hook and the first barb respectively, the connection structure among the first conductive terminal, the first busbar, and the first sleeve can be stable, thereby ensuring the stability of the overall structure of the first connector. In the connector assembly and connector of the present disclosure, since the second cover body and the second housing are also engaged with each other by the second hook and the second barb respectively, the connection structure among the second conductive terminal, the second busbar, and the second sleeve can be stable, thereby ensuring the stability of the overall structure of the second connector. In the connector assembly and connector of the present disclosure, since the plug passes through the first sleeve of the first connector and the second sleeve of the second connector at the same time, the electrical signals of the expansion card can be transmitted to the first circuit board by the plug, thereby achieving connection of electrical signals from different expansion cards with different connectors. In the connector assembly and connector of the present disclosure, since the blocking portion is disposed in the middle section of the plug, and the diameter of the blocking portion is greater than the diameter of the plug, the second connector is separated from the first connector by a distance, thereby achieving the structural ability of the first connector and the second connector in the connector assembly. In the connector assembly and connector of the present disclosure, since the inner surface of the first sleeve and the inner surface of the second sleeve are surrounded by the crown spring, the crown spring can not only increase the contact area between the plug and the first sleeve and between the plug and the second sleeve to meet the demand for transmitting large currents, the crown spring also provides a positive force between the plug and the first sleeve and between the plug and the second sleeve to achieve auxiliary fixation between the second connector and the plug. Overall, the connector assembly of the present disclosure can not only connect electrical signals from a plurality of expansion cards on a plurality of connectors, but also achieve structural stability of the plurality of connectors in the overall connector assembly.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A connector assembly, comprising:
- a first circuit board;
- a first connector disposed on the first circuit board, comprising:
  - a first conductive terminal;
  - a first busbar connected to the first conductive terminal; and
  - a first sleeve connected to the first busbar;
- a second circuit board separated from the first circuit board;
- a second connector disposed on the second circuit board, comprising:
  - a second conductive terminal;
  - a second busbar connected to the second conductive terminal; and
  - a second sleeve connected to the second busbar;
- a plug passing through the first sleeve of the first connector and the second sleeve of the second connector; and
- a blocking portion disposed on the plug, and the blocking portion abutting against or being fixed to the first connector.

2. The connector assembly of claim 1, wherein the blocking portion abuts against a top portion of the first sleeve.

3. The connector assembly of claim 1, wherein the first connector further comprises a first housing wrapping the first conductive terminal and a first cover body wrapping the first busbar, wherein the first housing comprises a first barb, the first cover body comprises a first hook, and the first housing and the first cover body are respectively engaged with each other by the first barb and the first hook.

4. The connector assembly of claim 3, wherein the first housing further has a first socket and a second socket separated from the first socket, and wherein the first conductive terminal comprises a first end portion corresponding to the first socket and a second end portion corresponding to the second socket.

5. The connector assembly of claim 4, wherein the second end portion of the first conductive terminal clamps the first busbar.

6. The connector assembly of claim 3, wherein the first cover body further comprises:
- a first cover main body;
- a first top plate covering the first cover main body; and
- a first partitioning portion disposed between the first cover main body and the first top plate, wherein the first partitioning portion, the first cover main body, and the first top plate jointly define two accommodating cavities of the first cover body.

7. The connector assembly of claim 6, wherein the first sleeve is located in one of the two accommodating cavities and runs through the first cover main body and the first top plate.

8. The connector assembly of claim 1, wherein the first busbar comprises:
- one or more first vertical extending portions contacting the first conductive terminal;
- one or more first bending portions connected to the one or more first vertical extending portions; and
- a first horizontal extending portion connected to the one or more first bending portions.

9. The connector assembly of claim 1, further comprising a crown spring, wherein the first sleeve has a hollowed through hole, the crown spring surrounds an inner surface of the hollowed through hole, and the crown spring clamps the plug.

10. The connector assembly of claim 1, wherein the first sleeve comprises:
- a sleeve main body connected to the first busbar;
- a cap portion located on a top portion of the sleeve main body and bearing against a surface of the first busbar, and a diameter of the cap portion is greater than a diameter of the sleeve main body; and
- an interfering portion disposed on the sleeve main body, and the interfering portion being engaged with the first busbar.

11. The connector assembly of claim 1, wherein a width of the blocking portion is greater than a width of the plug.

12. The connector assembly of claim 1, wherein the first conductive terminal comprises a plurality of one of the following or a combination of the following that are fixed to each other:
- a fixed conductive terminal comprising a first end portion, a second end portion, a fixed portion, and a welding pin; and
- a floating conductive terminal comprising a first end portion, a second end portion, and a fixed portion.

13. The connector assembly of claim 12, wherein the first end portion, the second end portion, the fixed portion, and the welding pin of the fixed conductive terminal are coplanar.

14. A connector, comprising:
- a first housing having a first socket and a second socket separated from the first socket, the first socket being configured to allow an expansion card to insert;
- a plurality of first conductive terminals, wherein each of the first conductive terminals comprises a first end portion corresponding to the first socket and a second end portion corresponding to the second socket;
- a first busbar with one end located in the second socket connected to the second end portion; and
- a first sleeve connected to the other end of the first busbar and having a groove or a through hole that are hollowed.

15. The connector of claim 14, further comprising a crown spring surrounding an inner surface of the groove or the through hole.

16. The connector of claim 14, wherein the first busbar comprises:
- one or more first vertical extending portions contacting the second end portion;
- one or more first bending portions connected to the one or more first vertical extending portions; and
- a first horizontal extending portion connected to the one or more first bending portions.

17. The connector of claim 14, wherein each of the first conductive terminals comprises a plurality of one of the following or a combination of the following that are fixed to each other:
- a fixed conductive terminal comprising a first end portion, a second end portion, a fixed portion, and a welding pin; and
- a floating conductive terminal comprising a first end portion, a second end portion, and a fixed portion.

18. The connector of claim 17, wherein the first end portion, the second end portion, the fixed portion, and the welding pin of the fixed conductive terminal are coplanar.

19. The connector of claim 14, further comprising a cover body, wherein the cover body comprises two accommodating cavities, the two accommodating cavities are separated by a partitioning portion, and the first busbar is accommodated in one of the two accommodating cavities.

20. The connector of claim 19, wherein each of the two accommodating cavities has an opening for heat dissipation.

* * * * *